United States Patent
Shute et al.

(10) Patent No.: US 12,458,291 B2
(45) Date of Patent: Nov. 4, 2025

(54) DETECTION OF IMPLANTABLE DEVICE ROTATION USING RESPIRATORY SIGNALS

(71) Applicant: Cardiac Pacemakers, Inc., St Paul, MN (US)

(72) Inventors: Jonathan B. Shute, Eagan, MN (US); Pramodsingh H. Thakur, Woodbury, MN (US); Bin Mi, Arden Hills, MN (US); John D. Hatlestad, Maplewood, MN (US)

(73) Assignee: Cardiac Pacemakers, Inc., St Paul, MN (US)

( * ) Notice: Subject to any disclaimer, the term of this patent is extended or adjusted under 35 U.S.C. 154(b) by 294 days.

(21) Appl. No.: 18/226,075

(22) Filed: Jul. 25, 2023

(65) Prior Publication Data

US 2024/0032868 A1 Feb. 1, 2024

Related U.S. Application Data

(60) Provisional application No. 63/392,327, filed on Jul. 26, 2022.

(51) Int. Cl.
*A61B 5/06* (2006.01)
*A61B 5/00* (2006.01)
*A61B 5/33* (2021.01)

(52) U.S. Cl.
CPC ............... *A61B 5/686* (2013.01); *A61B 5/33* (2021.01); *A61B 5/7278* (2013.01); *A61B 5/746* (2013.01); *A61B 2562/0219* (2013.01)

(58) Field of Classification Search
CPC .......... A61B 5/065; A61B 5/067; A61B 5/068
See application file for complete search history.

(56) References Cited

U.S. PATENT DOCUMENTS

| 7,658,196 B2 * | 2/2010 | Ferreri | A61F 5/0053 128/899 |
| 11,890,101 B2 * | 2/2024 | Shute | A61B 5/333 |

(Continued)

FOREIGN PATENT DOCUMENTS

| WO | 2015/171548 A1 | 11/2015 |
| WO | 2021/142278 A1 | 7/2021 |

OTHER PUBLICATIONS

International Search Report and Written Opinion received for PCT Patent Application No. PCT/US23/28607, mailed on Oct. 31, 2023, 9 pages.

*Primary Examiner* — Eric D. Bertram
(74) *Attorney, Agent, or Firm* — Faegre Drinker Biddle & Reath LLP

(57) ABSTRACT

Disclosed are medical devices with an acceleration sensor for generating acceleration data, at least two electrodes for generating electrocardiogram (ECG) data, a processor, and memory. The memory, which may be a non-transitory computer readable medium, contains computer-executable instructions that, when executed by the processor, causes the processor to perform the following: obtain the acceleration data and the ECG data from a first range of time and a second range of time different from the first range, generate respiration data based on the acceleration data, and determine that the medical device has flipped in orientation during the second range of time by comparing the respiration data and the ECG data of the first range of time with the respiration data and the ECG data of the second range of time.

20 Claims, 7 Drawing Sheets

(56) References Cited

U.S. PATENT DOCUMENTS

| | | |
|---|---|---|
| 2013/0211205 A1 | 8/2013 | Havel et al. |
| 2019/0083039 A1 | 3/2019 | Shute et al. |
| 2020/0214576 A1 | 7/2020 | Shute et al. |
| 2020/0383638 A1 | 12/2020 | Shute et al. |
| 2021/0030295 A1 | 2/2021 | Shute et al. |
| 2022/0031184 A1* | 2/2022 | Yoon .................... A61B 5/0537 |
| 2023/0072666 A1* | 3/2023 | Balczewski ............ A61B 5/085 |
| 2023/0201605 A1 | 6/2023 | Shute et al. |
| 2024/0074705 A1* | 3/2024 | Shute .................... A61B 5/067 |

* cited by examiner

DETECTION OF IMPLANTABLE DEVICE ROTATION USING RESPIRATORY SIGNALS

CROSS REFERENCE TO RELATED APPLICATION

This application claims priority to Provisional Application No. 63/392,327, filed Jul. 26, 2022, all of which are herein incorporated by reference in their entirety.

TECHNICAL FIELD

Embodiments of the present disclosure relate to medical devices and systems for sensing physiological parameters. More specifically, embodiments of the disclosure relate to determining whether an orientation of a medical device has changed.

BACKGROUND

Implantable medical devices (IMDs) may be configured to sense physiological parameters and/or provide therapy. The overall usable volume enclosed within a housing of an IMD may be adjusted based on considerations of patient comfort and performance. Examples of IMDs include implantable cardiac monitors, implantable loop recorders, and the like, which can be configured to be subcutaneously implanted in a patient for monitoring one or more physiological parameters such as, e.g., physiological parameters associated with the heart and/or the lungs.

To facilitate a more comfortable and efficient experience, these devices may be designed to keep the overall volume of the device as small as possible. Each year, the devices become smaller and include sensors with more and more capabilities.

Applicants have realized that, in many cases, the orientation of the sensor relative to the body can be an important input for sensors and algorithms, and some of IMDs have a relatively high probability of rotation in the body due to their geometry.

SUMMARY

Embodiments for detecting implantable medical device orientation changes include, but are not limited to, the following exemplary embodiments.

As recited herein, Example 1 is a medical device with an acceleration sensor for generating acceleration data, at least two electrodes for generating electrocardiogram (ECG) data, a processor, and memory. The memory, which may be a non-transitory computer readable medium, contains computer-executable instructions that, when executed by the processor, causes the processor to perform the following: obtain the acceleration data and the ECG data from a first range of time and a second range of time different from the first range, generate respiration data based on the acceleration data, and determine that the medical device has flipped in orientation during the second range of time by comparing the respiration data and the ECG data of the first range of time with the respiration data and the ECG data of the second range of time.

Example 2 is the medical device of Example 1, such that the determine that the medical device has flipped includes: identify a change from the respiration data and the ECG data of the first range of time to the second range of time; and determine, based on the identified change, that the medical device has flipped.

Example 3 is the medical device of Example 2, such that the comparing the respiration data and the ECG data includes performing at least one of: phase comparison analysis, correlation analysis, fiducial comparison analysis, or pattern recognition analysis.

Example 4 is the medical device of any one of Examples 1-3, which that the instructions are further configured to cause the processor to: update a heart sound generation algorithm in response to determining that the medical device has flipped, wherein the heart sound generation algorithm is configured to generate heart sound data based on the acceleration data.

Example 5 is a medical device with an acceleration sensor for generating acceleration data, an impedance sensor for generating impedance data, a processor, and memory. The memory, which may be a non-transitory computer readable medium, contains computer-executable instructions that, when executed by the processor, causes the processor to perform the following: obtain the acceleration data and the impedance data from a first range of time and a second range of time different from the first range, generate respiration data based on the acceleration data, and determine that the medical device has flipped in orientation during the second range of time by comparing the respiration data and the impedance data of the first range of time with the respiration data and the impedance data of the second range of time.

Example 6 is the medical device of Example 5, such that the determine that the medical device has flipped includes: identify a change from the respiration data and the impedance data of the first range of time to the second range of time; and determine, based on the identified change, that the medical device has flipped.

Example 7 is the medical device of Example 6, such that the comparing the respiration data and the impedance data includes performing at least one of: phase comparison analysis, correlation analysis, fiducial comparison analysis, or pattern recognition analysis.

Example 8 is the medical device of any one of Examples 5-7, such that the instructions are further configured to cause the processor to: update a heart sound generation algorithm in response to determining that the medical device has flipped, wherein the heart sound generation algorithm is configured to generate heart sound data based on the acceleration data.

Example 9 is the medical device of any preceding Example, such that the instructions are further configured to cause the processor to: perform recalibration of the medical device in response to determining that the medical device has flipped.

Example 10 is the medical device of any preceding Example, such that the first range of time and the second range of time are between 5 seconds and 30 seconds.

Example 11 is the medical device of any preceding Example, such that the instructions are further configured to cause the processor to: generate an alert notification to a user of the medical device in response to determining that the medical device has flipped.

Example 12 is the medical device of any preceding Example, such that the instructions are further configured to cause the processor to: switch between a low-power communication link and a high-power communication link for the medical device in response to determining that the medical device has flipped.

Example 13 is the medical device of any preceding Example, such that the instructions are further configured to cause the processor to: confirm that the respiration data is in a frequency range of below about 1 Hz.

Example 14 is a processor-implemented method which includes the following: obtaining acceleration data from an acceleration sensor of a medical device during a first range of time and a second range of time different from the first range; obtaining during the first range of time and the second range of time either (a) electrocardiogram (ECG) data from at least two electrodes of the medical device or (b) impedance data from an impedance sensor of the medical device; generating respiration data based on the acceleration data; and determining that the medical device has flipped in orientation during the second range of time by comparing the respiration data and either (a) the ECG data or (b) the impedance data of the first range of time with the respiration data and either (a) the ECG data or (b) the impedance data of the second range of time.

Example 15 is the method of Example 14, such that the comparing the respiration data and either (a) the ECG data or (b) the impedance data includes: performing at least one of: phase comparison analysis, correlation analysis, fiducial comparison analysis, or pattern recognition analysis.

Example 16 is a system which includes a medical device with an acceleration sensor configured to generate acceleration data and at least two electrodes configured to generate electrocardiogram (ECG) data, a processor, and a memory. The memory contains computer-executable instructions that, when executed by the processor, cause the processor to perform the following: obtain the acceleration data and the ECG data from a first range of time and a second range of time different from the first range, generate respiration data based on the acceleration data, and determine that the medical device has flipped in orientation during the second range of time by comparing the respiration data and the ECG data of the first range of time with the respiration data and the ECG data of the second range of time.

Example 17 is the system of Example 16, such that the instructions are configured to cause the processor to determine that the medical device has flipped by causing the processor to: identify a change from the respiration data and the ECG data of the first range of time to the second range of time; and determine, based on the identified change, that the medical device has flipped.

Example 18 is the system of Example 16, such that the comparing the respiration data and the ECG data includes performing at least one of: phase comparison analysis, correlation analysis, fiducial comparison analysis, or pattern recognition analysis.

Example 19 is the system of Example 16, such that the instructions are further configured to cause the processor to: update a heart sound generation algorithm in response to determining that the medical device has flipped, wherein the heart sound generation algorithm is configured to generate heart sound data based on the acceleration data.

Example 20 is the system of Example 16, such that the instructions are further configured to cause the processor to: perform recalibration of the medical device in response to determining that the medical device has flipped.

Example 21 is the system of Example 16, such that the first range of time and the second range of time are between 5 seconds and 30 seconds.

Example 22 is the system of Example 16, such that the instructions are further configured to cause the processor to: generate an alert notification to a user of the medical device in response to determining that the medical device has flipped.

Example 23 is the system of Example 16, such that the instructions are further configured to cause the processor to: switch between a low-power communication link and a high-power communication link for the medical device in response to determining that the medical device has flipped.

Example 24 is the system of Example 16, such that the instructions are further configured to cause the processor to: confirm that the respiration data is in a frequency range of below about 1 Hz.

Example 25 is a system which includes a medical device with an acceleration sensor configured to generate acceleration data and an impedance sensor configured to generate impedance data, a processor, and a memory. The memory contains computer-executable instructions that, when executed by the processor, cause the processor to perform the following: obtain the acceleration data and the impedance data from a first range of time and a second range of time different from the first range, generate respiration data based on the acceleration data, and determine that the medical device has flipped in orientation during the second range of time by comparing the respiration data and the impedance data of the first range of time with the respiration data and the impedance data of the second range of time.

Example 26 is the system of Example 25, such that the instructions are configured to cause the processor to determine that the medical device has flipped by causing the processor to: identify a change from the respiration data and the impedance data of the first range of time to the second range of time; and determine, based on the identified change, that the medical device has flipped.

Example 27 is the system of Example 25, such that the comparing the respiration data and the impedance data includes performing at least one of: phase comparison analysis, correlation analysis, fiducial comparison analysis, or pattern recognition analysis.

Example 28 is the system of Example 25, such that the instructions are further configured to cause the processor to: update a heart sound generation algorithm in response to determining that the medical device has flipped, wherein the heart sound generation algorithm is configured to generate heart sound data based on the acceleration data.

Example 29 is the system of Example 25, such that the instructions are further configured to cause the processor to: perform recalibration of the medical device in response to determining that the medical device has flipped.

Example 30 is the system of Example 25, such that the first range of time and the second range of time are between 5 seconds and 30 seconds.

Example 31 is the system of Example 25, such that the instructions are further configured to cause the processor to: generate an alert notification to a user of the medical device in response to determining that the medical device has flipped.

Example 32 is the system of Example 25, such that the instructions are further configured to cause the processor to: switch between a low-power communication link and a high-power communication link for the medical device in response to determining that the medical device has flipped.

Example 33 is the system of Example 25, such that the instructions are further configured to cause the processor to: confirm that the respiration data is in a frequency range of below about 1 Hz.

Example 34 is a processor-implemented method which includes the following: obtaining acceleration data from an acceleration sensor of a medical device during a first range of time and a second range of time different from the first range; obtaining during the first range of time and the second range of time either (a) electrocardiogram (ECG) data from at least two electrodes of the medical device or (b) impedance data from an impedance sensor of the medical device;

generating respiration data based on the acceleration data; and determining that the medical device has flipped in orientation during the second range of time by comparing the respiration data and either (a) the ECG data or (b) the impedance data of the first range of time with the respiration data and either (a) the ECG data or (b) the impedance data of the second range of time.

Example 35 is the method of Example 34, such that the comparing the respiration data and either (a) the ECG data or (b) the impedance data includes: performing at least one of: phase comparison analysis, correlation analysis, fiducial comparison analysis, or pattern recognition analysis.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

Figure 1:
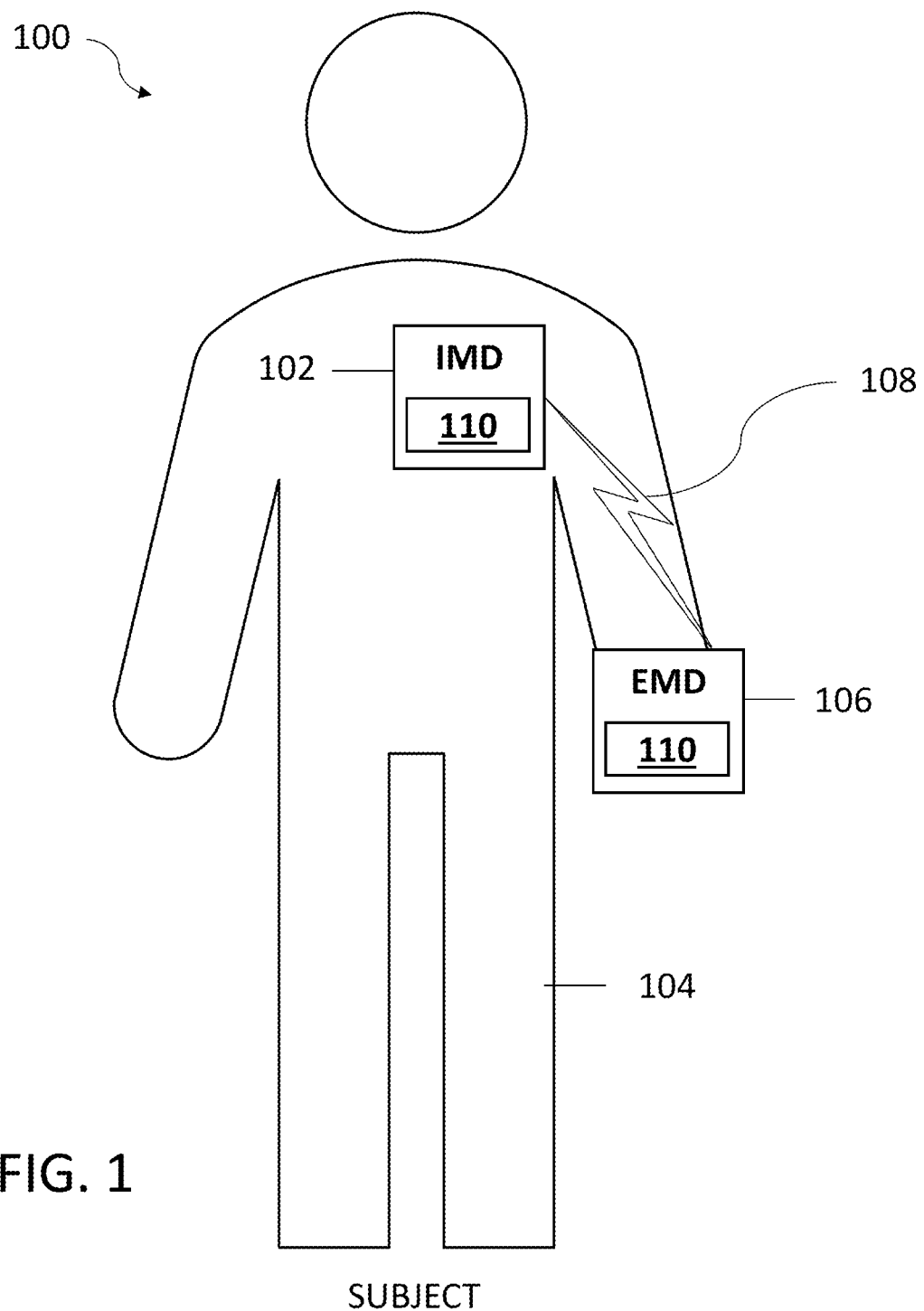
FIG. 1 is a schematic illustration depicting an illustrative medical system, in accordance with embodiments of the disclosure.

While the disclosed subject matter is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

As used herein in association with values (e.g., terms of magnitude, measurement, and/or other degrees of qualitative and/or quantitative observations) that are used herein with respect to characteristics (e.g., dimensions, measurements, attributes, components) and/or ranges thereof, of tangible things (e.g., products, inventory) and/or intangible things (e.g., data, electronic representations of currency, accounts, information, portions of things (e.g., percentages, fractions), calculations, data models, dynamic system models, algorithms, parameters), "about" and "approximately" may be used, interchangeably, to refer to a value, configuration, orientation, and/or other characteristic that is equal to (or the same as) the stated value, configuration, orientation, and/or other characteristic or equal to (or the same as) a value, configuration, orientation, and/or other characteristic that is reasonably close to the stated value, configuration, orientation, and/or other characteristic, but that may differ by a reasonably small amount such as will be understood, and readily ascertained, by individuals having ordinary skill in the relevant arts to be attributable to measurement error; differences in measurement and/or manufacturing equipment calibration; human error in reading and/or setting measurements; adjustments made to optimize performance and/or structural parameters in view of other measurements (e.g., measurements associated with other things); particular implementation scenarios; imprecise adjustment and/or manipulation of things, settings, and/or measurements by a person, a computing device, and/or a machine; system tolerances; control loops; machine-learning; foreseeable variations (e.g., statistically insignificant variations, chaotic variations, system and/or model instabilities); preferences; and/or the like.

Although the term "block" may be used herein to connote different elements illustratively employed, the term should not be interpreted as implying any requirement of, or particular order among or between, various blocks disclosed herein. Similarly, although illustrative methods may be represented by one or more drawings (e.g., flow diagrams, communication flows), the drawings should not be interpreted as implying any requirement of, or particular order among or between, various steps disclosed herein. However, certain embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values) may include one or more items, and, similarly, a subset or subgroup of items may include one or more items. A "plurality" means more than one.

DETAILED DESCRIPTION

Embodiments of the disclosure use various approaches to determine a change in orientation of an implantable medical device (IMD). The IMD may be configured to obtain acceleration data as well as electrocardiogram (ECG) data and/or impedance data, and such data is analyzed to determine whether the IMD has flipped. According to embodiments, an IMD has flipped when its orientation with respect to at least one axis (e.g., longitudinal axis) has changed by approximately 180 degrees.

FIG. 1 shows an illustrative medical system 100, in accordance with embodiments of the disclosure. As shown in FIG. 1, the medical system 100 includes an IMD 102 configured to be implanted within the body of a subject 104, and an external monitoring device (EMD) 106, which is communicatively coupled to the IMD 102 via a communication link 108. In the illustrated embodiments, the medical system 100 is operatively coupled to the subject 104, and the IMD 102 and the EMD 106 are configured to communicate with one another over the communication link 108.

The IMD and EMD

According to embodiments, the IMD 102 may be a control device, a monitoring device, a pacemaker, an implantable cardioverter defibrillator (ICD), a cardiac resynchronization therapy (CRT) device and/or the like and may be an implantable medical device known in the art or later developed, for providing therapy and/or diagnostic data about the subject 104 and/or the IMD 102. In various embodiments, the IMD 102 may include both defibrillation and pacing/CRT capabilities (e.g., a CRT-D device).

In embodiments, the IMD 102 may be implanted subcutaneously within an implantation location or pocket in the patient's chest or abdomen and may be configured to monitor (e.g., sense and/or record) physiological parameters associated with the patient's heart. In embodiments, the IMD 102 may be an implantable cardiac monitor (ICM) (e.g., an implantable diagnostic monitor (IDM), an implantable loop recorder (ILR)) configured to record physiological parameters such as, for example, one or more cardiac electrical signals, heart sounds, heart rate, blood pressure measurements, oxygen saturations, and/or the like.

In embodiments, the IMD 102 may be configured to detect a variety of physiological signals that may be used in connection with various diagnostic, therapeutic and/or monitoring implementations. For example, the IMD 102 may include sensors or circuitry for detecting respiratory system signals, cardiac system signals, heart sounds, and/or signals related to patient activity. In embodiments, the IMD 102 may be configured to sense intrathoracic impedance, from which various respiratory parameters may be derived, including, for example, respiratory tidal volume and minute ventilation.

In embodiments, sensors and associated circuitry may be incorporated in the IMD 102 for detecting one or more body movement or body posture, body orientation, and/or body position related signals. For example, accelerometers and/or GPS devices may be employed to detect patient activity, patient location, body orientation, and/or torso position. According to embodiments, for example, the IMD 102 may include an acceleration sensor 110 configured to generate an acceleration signal and/or acceleration data, which may include the acceleration signal, information derived from the acceleration signal, and/or the like. In embodiments, the acceleration data includes acceleration measurements associated with movement of the IMD 102. In embodiments, the acceleration sensor may be, or include, any acceleration sensor able to generate measurements associated with its motion. An "acceleration sensor" or "accelerometer" as used herein, may be, or include, any type of accelerometer, gyroscope, magnetometer, inertial measurement unit (IMU), and/or any other type of sensor or combination of sensors configured to measure changes in acceleration, angular velocity, and/or the like. According to embodiments, acceleration data may be used to determine that the IMD 102 has flipped.

Derived parameters may also be monitored using the IMD 102. For example, a sleep sensor may rely on measurements taken by an implanted accelerometer that measures body activity levels. The sleep sensor may estimate sleeping patterns based on the measured activity levels. Other derived parameters include, but are not limited to, a functional capacity indicator, autonomic tone indicator, sleep quality indicator, cough indicator, anxiety indicator, and a cardiovascular wellness indicator for calculating a quality of life indicator quantifying a subject's overall health and well-being.

In various embodiments, the EMD 106 may be a device that is configured to be portable with the subject 104, e.g., by being integrated into a vest, belt, harness, sticker; placed into a pocket, a purse, or a backpack; carried in the subject's hand; and/or the like, or otherwise operatively (and/or physically) coupled to the subject 104. The EMD 106 may be configured to monitor (e.g., sense and/or record) physiological parameters associated with the subject 104 and/or provide therapy to the subject 104. For example, the EMD 106 may be, or include, a wearable cardiac defibrillator (WCD) such as a vest that includes one or more defibrillation electrodes. In embodiments, the EMD 106 may include any number of different therapy components such as, for example, a defibrillation component, a drug delivery component, a neurostimulation component, a neuromodulation component, a temperature regulation component, and/or the like. In embodiments, the EMD 106 may include limited functionality, e.g., defibrillation shock delivery and communication capabilities, with arrhythmia detection, classification and/or therapy command/control being performed by a separate device such as, for example, the IMD 102.

In embodiments, the communication link 108 may be, or include, a wireless communication link such as, for example, a short-range radio link, such as Bluetooth, IEEE 802.11, a proprietary wireless protocol, and/or the like. In embodiments, for example, the communication link 108 may utilize Bluetooth Low Energy radio, or a similar protocol, and may utilize an operating frequency in the range of 2.40 to 2.48 GHz. The term "communication link" may refer to an ability to communicate some type of information in at least one direction between at least two devices and should not be understood to be limited to a direct, persistent, or otherwise limited communication channel. That is, according to embodiments, the communication link 108 may be a persistent communication link, an intermittent communication link, an ad-hoc communication link, and/or the like. The communication link 108 may refer to direct communications between the IMD 102 and the EMD 106, and/or indirect communications that travel between the IMD 102 and the EMD 106 via at least one other device (e.g., a repeater, router, hub). The communication link 108 may facilitate uni-directional and/or bi-directional communication between the IMD 102 and the EMD 106. Data and/or control signals may be transmitted between the IMD 102 and the EMD 106 to coordinate the functions of the IMD 102 and/or the EMD 106. In embodiments, patient data may be downloaded from one or more of the IMD 102 and the EMD 106 periodically or on command. The physician and/or the patient may communicate with the IMD 102 and the EMD 106, for example, to acquire patient data or to initiate, terminate and/or modify recording and/or therapy.

In embodiments, the IMD 102 and/or the EMD 106 may provide one or more of the following functions with respect to a patient: sensing, data analysis, and therapy. For example, in embodiments, the IMD 102 and/or the EMD 106 may be used to measure any number of a variety of physiological, device, subjective, and/or environmental parameters associated with the subject 104, using electrical, mechanical, and/or chemical means. The IMD 102 and/or the EMD 106 may be configured to automatically gather data, gather data upon request (e.g., input provided by the subject, a clinician, another device), and/or any number of various combinations and/or modifications thereof. The IMD 102 and/or EMD 106 may be configured to store data related to the physiological, device, environmental, and/or subjective parameters and/or transmit the data to any number of other devices in the system 100. In embodiments, the IMD 102 and/or the EMD 106 may be configured to analyze data and/or act upon the analyzed data. For example, the IMD 102 and/or EMD 106 may be configured to modify therapy, perform additional monitoring, and/or provide alarm indications based on the analysis of the data.

In embodiments, the IMD 102 and/or the EMD 106 may be configured to provide therapy. Therapy may be provided automatically and/or upon request (e.g., an input by the subject 104, a clinician, another device or process). The IMD 102 and/or the EMD 106 may be programmable in that various characteristics of their sensing, therapy (e.g., duration and interval), and/or communication may be altered by communication between the devices 102 and 106 and/or other components of the system 100.

The illustrative cardiac monitoring system 100 shown in FIG. 1 is not intended to suggest any limitation as to the scope of use or functionality of embodiments of the present disclosure. The illustrative cardiac monitoring system 100 should not be interpreted as having any dependency or requirement related to any single component or combination of components illustrated therein. Additionally, various components depicted in FIG. 1 may be, in embodiments, integrated with various ones of the other components depicted therein (and/or components not illustrated), all of which are considered to be within the ambit of the subject matter disclosed herein.

Various components depicted in FIG. 1 may operate together to form the monitoring system 100, which may be, for example, a computerized patient management and monitoring system. In embodiments, the system 100 may be designed to assist in monitoring the subject's condition, managing the subject's therapy, and/or the like.

Figure 2:
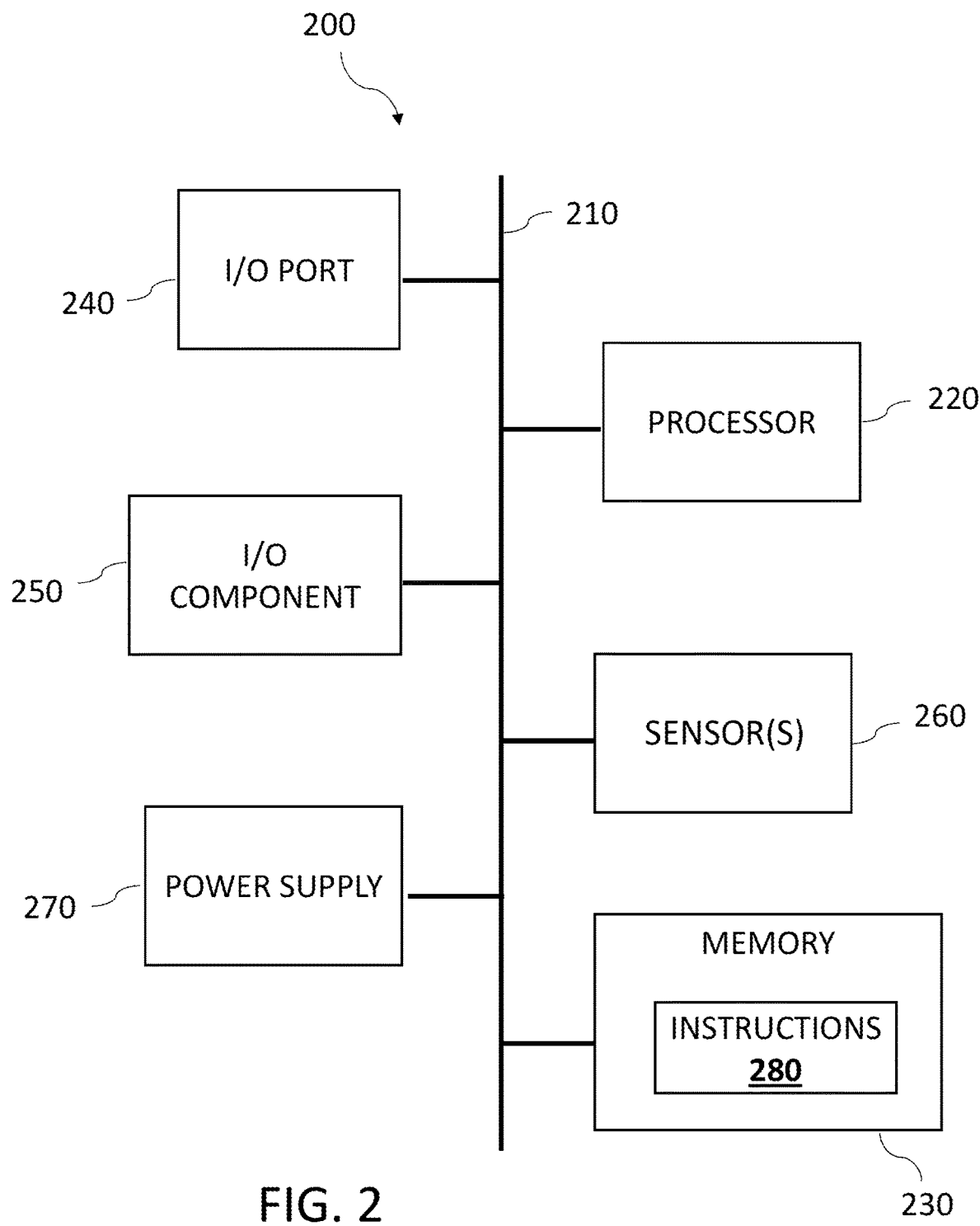
FIG. 2 is a block diagram depicting an illustrative computing device, in accordance with embodiments of the disclosure.

Any number of components of the system 100 may be implemented using one or more computing devices. That is, for example, IMD 102 and/or EMD 106 may be implemented on one or more computing devices. FIG. 2 is a block diagram depicting an illustrative computing device 200, in accordance with embodiments of the disclosure. The computing device 200 may include any type of computing device suitable for implementing aspects of embodiments of the disclosed subject matter. Examples of computing devices include specialized computing devices or general-purpose computing devices such "workstations," "servers," "laptops," "desktops," "tablet computers," "hand-held devices," "smartphones," "general-purpose graphics processing units (GPGPUs)," and the like, all of which are contemplated within the scope of FIGS. 1 and 2, with reference to various components of the system 100 and/or computing device 200.

In embodiments, the computing device 200 includes a bus 210 that, directly and/or indirectly, couples one or more of the following devices: a processor 220, a memory 230, an input/output (I/O) port 240, an I/O component 250, one or more sensors 260 (e.g., the acceleration sensor 110 depicted in FIG. 1 as well as any other suitable sensor as disclosed herein to perform the necessary measurements, such as an impedance sensor, optical sensor, or sensors associated with an electrode, for example), and a power supply 270. Any number of additional components, different components, and/or combinations of components may also be included in the computing device 200. The I/O component 250 may include a presentation component configured to present information to a user such as, for example, a display device, a speaker, a printing device, and/or the like, and/or an input component such as, for example, a microphone, a joystick, a satellite dish, a scanner, a printer, a wireless device, a keyboard, a pen, a voice input device, a touch input device, a touch-screen device, an interactive display device, a mouse, and/or the like.

The bus 210 represents what may be one or more busses (such as, for example, an address bus, data bus, or combination thereof). Similarly, in embodiments, the computing device 200 may include a number of processors 220, a number of memory components 230, a number of I/O ports 240, a number of I/O components 250, a number of sensors 260 (e.g., acceleration sensors, electrodes, impedance sensors, etc.), and/or a number of power supplies 270. Additionally, any number of these components, or combinations thereof, may be distributed and/or duplicated across a number of computing devices.

In embodiments, the memory 230 includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; and/or any other medium that can be used to store information and can be accessed by a computing device such as, for example, quantum state memory, and/or the like. In embodiments, the memory 230 is a non-transitory computer readable medium which stores computer-executable instructions 280 for causing the processor 220 to implement aspects of embodiments of system components discussed herein and/or to perform aspects of embodiments of methods and procedures discussed herein.

The computer-executable instructions 280 may include, for example, computer code, machine-useable instructions, and the like such as, for example, program components capable of being executed by one or more processors 220 associated with the computing device 200. Program components may be programmed using any number of different programming environments, including various languages, development kits, frameworks, and/or the like. Some or all of the functionality contemplated herein may also, or alternatively, be implemented in hardware and/or firmware.

According to embodiments, for example, the instructions 280 may be configured to be executed by the processor 220 and, upon execution, to cause the processor 220 to perform certain processes. In certain embodiments, the processor 220, memory 230, and instructions 280 are part of a controller such as an application specific integrated circuit (ASIC), field-programmable gate array (FPGA), and/or the like. Such devices can be used to carry out the functions and steps described below.

Determining a Change in Orientation of the IMD

Figure 3A:
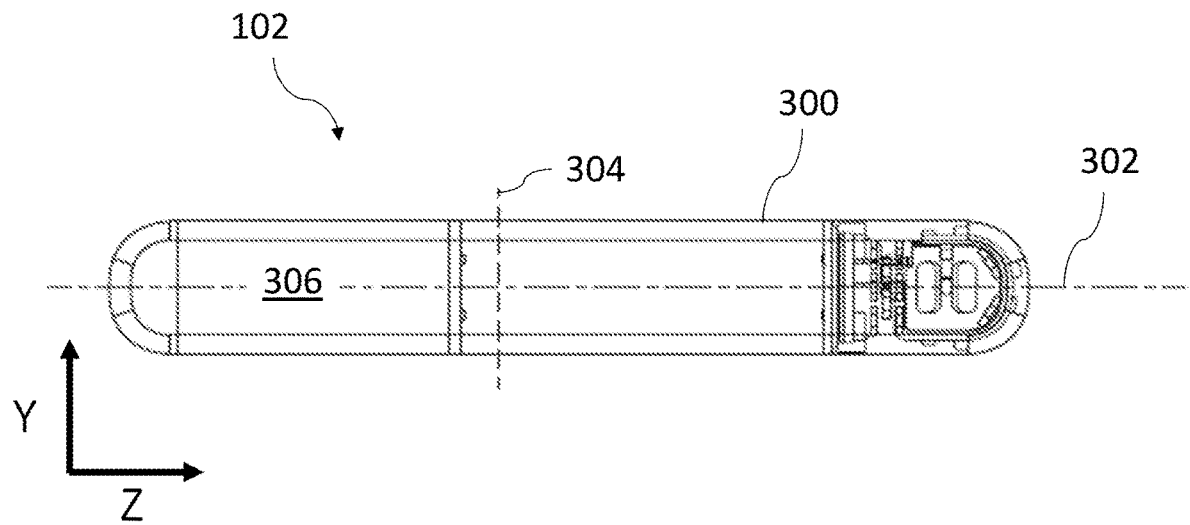
FIGS. 3A and 3B show different views of an implantable medical device, in accordance with embodiments of the disclosure.
Figure 3B:
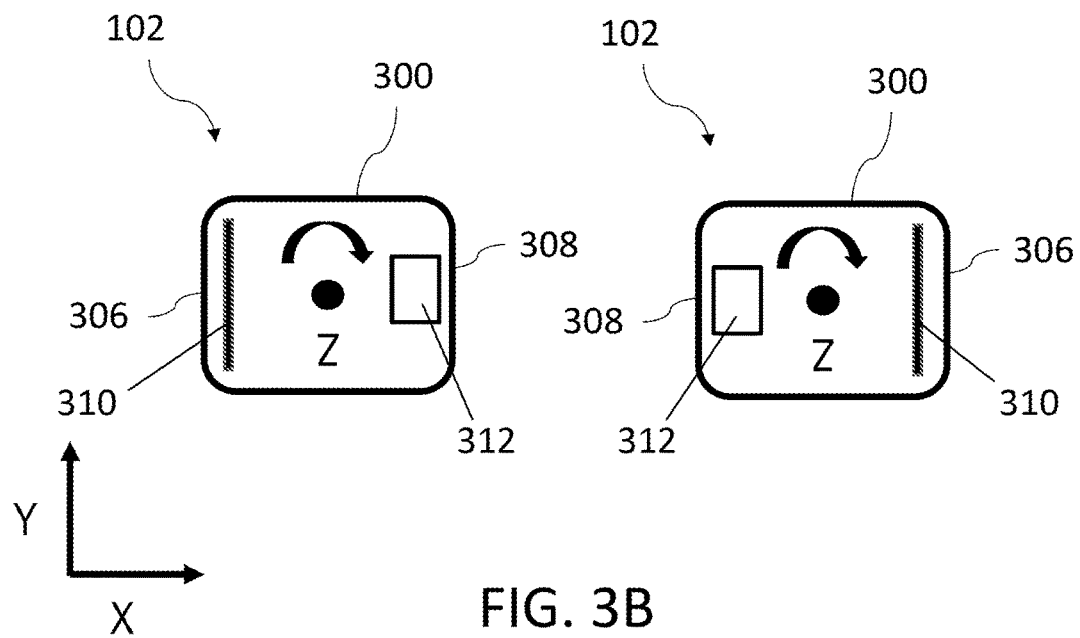

Embodiments of the present disclosure involve various approaches for determining when the IMD 102 has flipped when implanted in a patient's body. FIGS. 3A and 3B show an example IMD 102. As shown in FIGS. 3A and 3B, the IMD 102 includes a body 300 that defines outer shape of the IMD 102. The IMD 102 in FIGS. 3A and 3B, as just one example, extends lengthwise along a Z-axis 302 which extends across the page in FIG. 3A and into and out of the page in FIG. 3B. The IMD 102 has a height along a Y-axis 304. The IMD 102 has multiple outer faces or sides. For example, FIG. 3B includes reference numbers for two of the sides of the IMD 102. One side is denoted with reference number 306 and the opposite side is denoted with reference number 308.

In embodiments, when the IMD 102 has flipped, the sides 306 and 308 have switched places as can be seen in comparing the two schematics of the IMD 102 in FIG. 3B. Electrodes 310 may be implemented in any suitable locations inside the IMD 102 or on the surface of the IMD 102 as known in the art (for simplicity, only one electrode is shown in the figure). Two or more electrodes 310 are implemented in the IMD 102 to measure biopotential information such ECG data, for example. An impedance sensor 312 may also be implemented as shown, in any suitable location within the IMD 102 to take impedance measurements. For example, when the IMD 102 has rotated about 180° around the Z-axis 302, the IMD 102 can be considered to have flipped. In some embodiments, when the IMD has flipped along any one of the aforementioned axes, the coordinates of a point on a surface of the IMD (or in some examples, inside the IMD) change accordingly. For example, when the IMD flips along the X-axis, the Y-component and the Z-component of the coordinate change, such as by changing the sign in each component (from positive to negative, or vice versa). This property of sign change can be utilized to effectively determine or confirm that the IMD has flipped, as further explained herein. When an IMD flips when implanted in a patient's body, the orientation change can affect various aspects of the IMD. For example, as will be described in more detail below, flipping can affect one or more of the following: posture algorithms/determinations, heart sound detection, impedance measurements, optical measurements, and temperature measurements.

Figure 4:
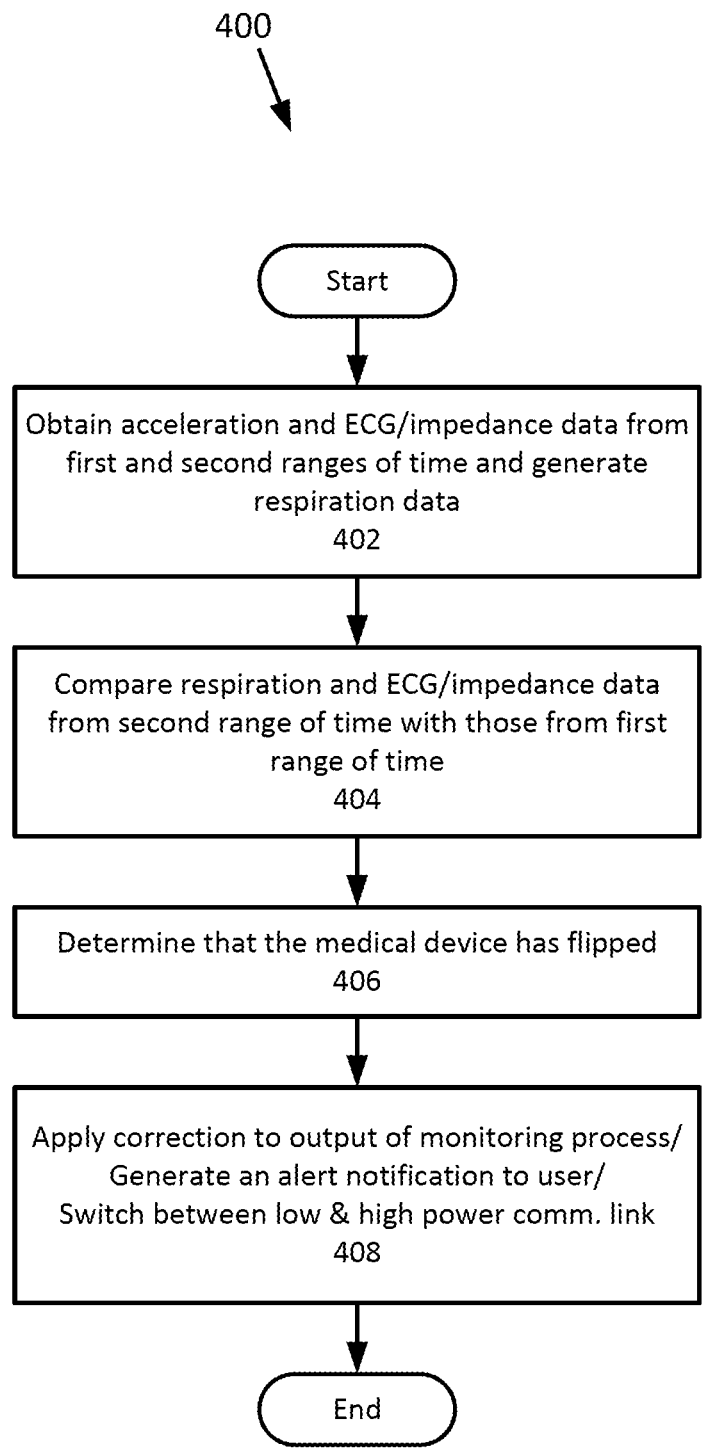
FIG. 4 is a flow diagram depicting an illustrative method of medical device operation, in accordance with embodiments of the disclosure.

As shown in FIG. 4, a process 400 according to some embodiments, may include having a processor obtain the acceleration data (including a plurality of acceleration measurements taken of the IMD 102) from the acceleration sensor during a first range of time and a second range of time different from the first range, in step 402. Also, in some examples, at least two electrodes may be implemented to facilitate taking measurements for generating ECG data during the first range of time and the second range of time. Additionally or alternatively, in some examples, an impedance sensor may be implemented to facilitate taking impedance measurement data during the first range of time and the second range of time.

The processor, in step 404, compares the acceleration data and the ECG and/or impedance data obtained during the first range of time with the acceleration data and the ECG and/or impedance data obtained during the second range of time. In some examples, respiration data can be extracted or determined from the acceleration data, and the respiration data over different time ranges can be compared with each other, along with the ECG/impedance data taken during the same ranges.

Based on the comparison, the processor, in step 406, determines that the IMD has flipped between the first and second ranges of time. In some examples, the determination that the IMD has flipped causes the processor to perform one or more of the following: apply correction to output of monitoring process, such as updating the heart sound generation algorithm (which is used to generate the heart sound data based on the acceleration data obtained using the accelerometer) and/or performing recalibration of the IMD; generate an alert notification to a user (e.g., patient using the IMD, doctor, caregiver); and/or switch between the low-powered communication link and the high power communication link (which may be Bluetooth, for example), in step 408. For example, a low-powered communication link may be used when the IMD is oriented such that its antenna requires less power to successfully transmit and receive wireless signals. Such an orientation may be when the antenna faces or is otherwise closer to the patient's skin on their chest compared to an opposite flipped orientation. A high-powered communication link can be used when the antenna is oriented such that signals must pass through more tissue, etc., compared to an opposite flipped orientation.

Figure 5:
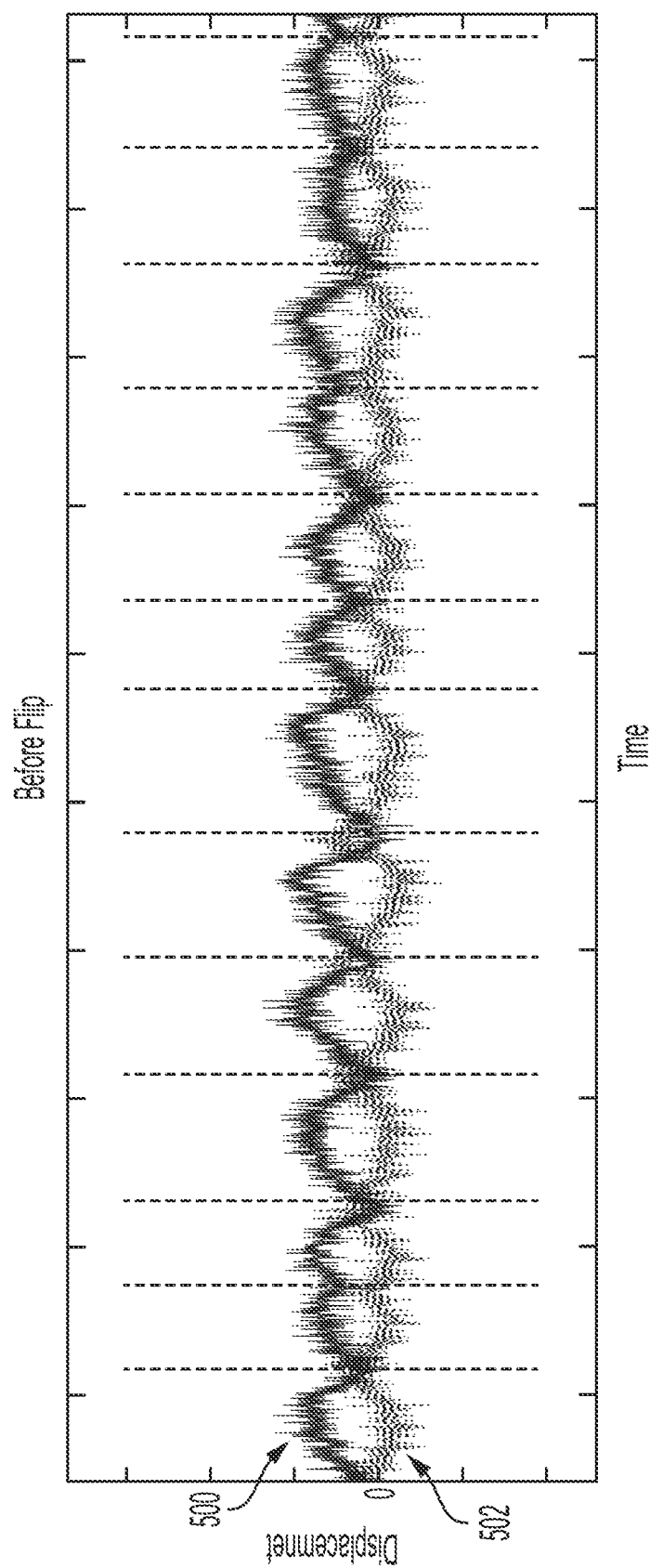
FIG. 5 is an example of a respiration data graph generated in accordance with certain embodiments of the disclosure, before detecting that the device has flipped.

FIG. 5 shows an exemplary respiration data graph before a device flip is detected, in a first range of time. The respiration data graph compares an acceleration waveform 500 (solid line) with an impedance waveform 502 (dotted line) as generated according to examples disclosed herein. The acceleration waveform 500 represents the respiration waveform in that the acceleration waveform 500 generally forms a wave curve with a plurality of peaks and nadirs, where each occurs according to an apparent phase as determined. Similarly, the impedance waveform 502 also follows a same or similar length of time in each apparent phase as the acceleration waveform 500, but the impedance waveform 502 is inverted from the acceleration waveform 500. For example, FIG. 5 shows each nadir in the acceleration waveform 500 occurring throughout the measurement using broken vertical lines, and each vertical line coincides with a peak of the impedance waveform 502.

Figure 6:
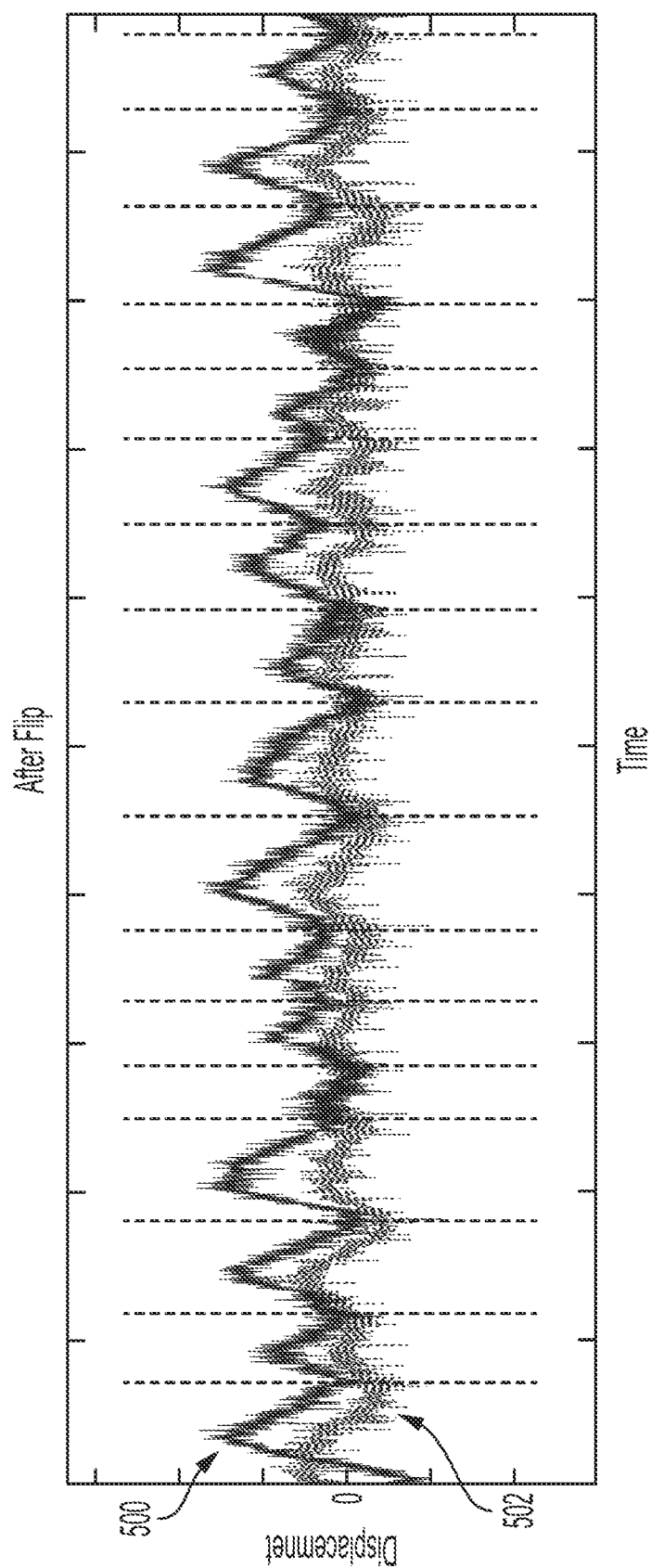
FIG. 6 is an example of a respiration data graph generated in accordance with certain embodiments of the disclosure, after detecting that the device has flipped.

FIG. 6 shows an exemplary respiration data graph after a device flip is detected, in a second range of time following the first range of time shown in FIG. 5. The acceleration waveform 500 now has the same polarity as the impedance waveform 502 such that each nadir in the acceleration waveform 500 generally coincides with a nadir in the impedance waveform 502, as shown using vertical broken lines. This is caused by the acceleration waveform 500 reversing in its polarity while the impedance waveform 502 remains constant, because flipping does not affect the impedance measurement.

In view of the above, the flipping of the device can be determined by detecting a change in the apparent phase of these waveforms with respect to each other during the two different ranges of time in which they are measured. As such, in the example shown in FIGS. 5 and 6, the device is detected to have flipped after the data used to generate the graph in FIG. 5 was measured, but before the data used to generate the graph in FIG. 6 was measured, by comparing the two graphs that are generated.

Figure 7:
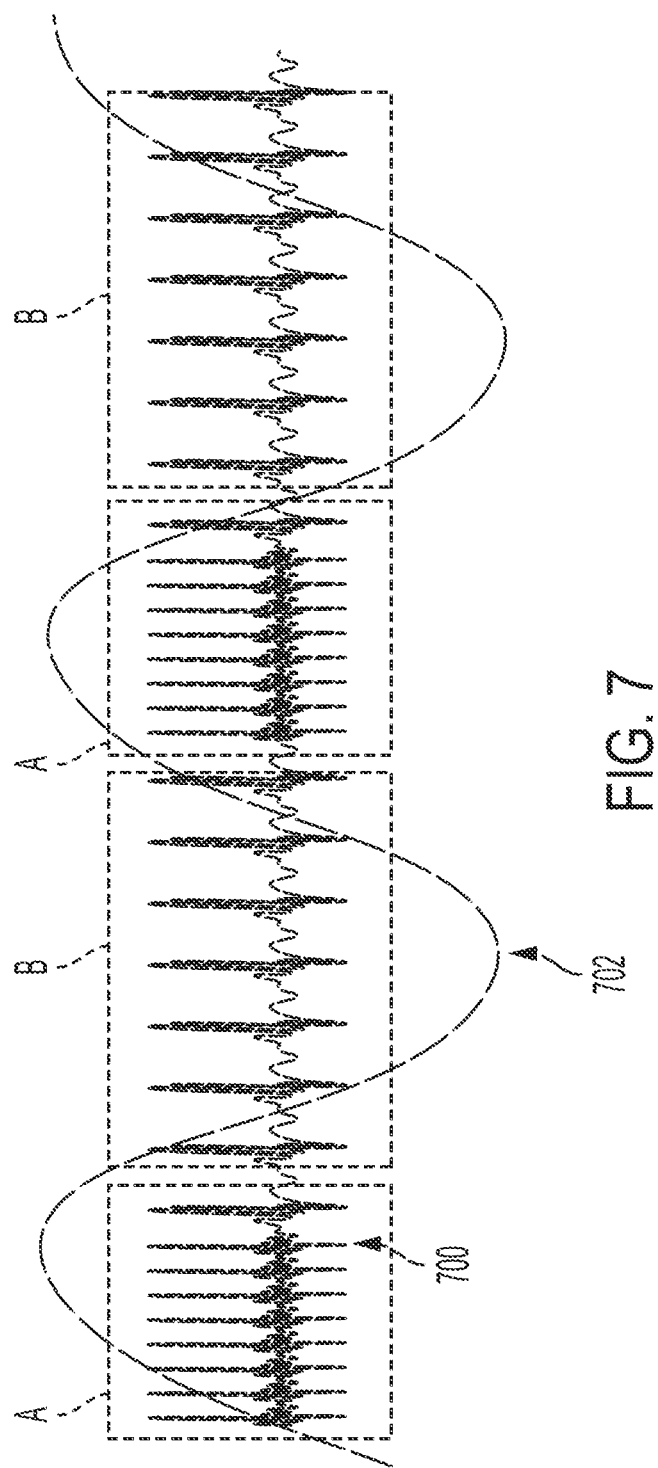
FIG. 7 is an example of a relationship between electrocardiogram (ECG) data and respiration waveform respiratory sinus arrhythmia (RSA).

FIG. 7 shows a relationship between the ECG data and respiration waveform using respiratory sinus arrhythmia (RSA), which is heart rate variability in synchronization with respiration, by which the RR interval (that is, the time elapsed between two successive R waves of the QRS signal) on an ECG is shortened during inspiration and prolonged during expiration. ECG data 700 is compared with respiration waveform 702 that is associated with the ECG data 700, and it can be seen that an increase in respiration (e.g., during inspiration or when the patient is inhaling) coincides with an increase in the frequency of the pulses in the ECG data 700, while a decrease in respiration (e.g., during expiration or when the patient is exhaling) coincides with a decrease in the frequency of the pulses in the ECG data 700. Therefore, a region of greater frequency (shown via box "A") can be used to estimate the peak of respiration (i.e., when the lungs are most filled) while a region of lesser frequency (shown via box "B") can be used to estimate the nadir of respiration (i.e., when the lungs are least filled).

In this example, when the device is flipped, the respiration waveform 702 is flipped or reverses in direction (because the respiration waveform 702 is based on acceleration measurement, which changes polarity when the device flips) whereas the ECG data 700 remains the same. Therefore, when the processor detects that the nadir of respiration according to the respiration waveform 702 coincides with the region of greater frequency (box "A") according to the ECG data 700, the processor may determine that the device has flipped.

According to some examples, the comparison (whether it is between the acceleration data and the impedance data or between the ECG data and the respiration data generated from the acceleration data) may involve determining two separate ranges or spans of time, a first range and a second range, which chronologically follows the first range. The first and second ranges of time may or may not be immediately next to each other. In some examples, there may be a span of time between the two ranges. Once the two ranges are determined, the data collected during the first and the second ranges are compared with each other, and when there is an observable difference in directionality in the details (e.g., there is a change such as an inversion in the impedance data measurement), the processor determines that the IMD has flipped between the first and second ranges of time.

In some examples, the specific timespan of the first and second ranges of time may be determined by how often the processor receives data from the IMD in question. For example, if the IMD transmits acceleration data and impedance data only during a predetermined time interval (for example, 5 seconds, 10 seconds, 15 seconds, 20 seconds, 25 seconds, 30 seconds, 45 seconds, 1 minute, 2 minutes, 3 minutes, 5 minutes, 10 minutes, or any other suitable time or time range therebetween), and the measurement for such data is performed on a regular or semi-regular basis, for example once a day, 5 times a day, 10 times a day, 20 times a day, or any other suitable frequency therebetween. With greater frequency, the detection of such flipping can be recorded and suitable actions can be taken with greater immediacy. In some examples, the processor confirms that the respiration data that is generated based on the acceleration data is correct by determining a frequency range of the generated respiration data. If the frequency range is within a predetermined threshold, for example at or less than about 1 Hz, at or less than 0.5 Hz, or any other suitable value or range therebetween, the processor proceeds to perform the analysis as disclosed herein. Otherwise, the processor may take the measurement again.

In some examples, the comparison involves the processor performing at least one of: phase comparison analysis, correlation analysis, fiducial comparison analysis, or pattern recognition analysis. It is to be understood that any other types of comparison analysis may be performed using the same obtained data, as known in the art.

In a phase comparison analysis, the processor determines the apparent phase of respiration data from the data generated in the first range of time and the second range of time, then compares the determined phases to calculate the difference between the apparent phases. If the calculated difference indicates an approximately 180° apparent phase shift in the respiration data or is greater than a predetermined threshold, the processor determines that the IMD has flipped. In certain embodiments, the phase comparison analysis is performed by comparing the phase shift in the respiration data over time.

In a correlation analysis, the processor determines the correlation between the respiration data during the first and second ranges of time, for example by generating a correlation map using the data from the two ranges of time. In some examples, if the correlation between the data taken during the two ranges of time is approximately −1, it would indicate a negative relationship (that is, the higher value measured in the first range of time corresponds to the lower value measured in the second range of time, or vice versa), and the processor determines that the IMD has flipped.

In a fiducial comparison analysis, a fiducial marker (or points assumed as a fixed basis of comparison) is determined in the data obtained during the two ranges of time. The fiducial marker may include peaks and/or nadirs of a waveform of the respiration data. The fiducial from the first range of time is then compared to the fiducial from the second range of time, and if there is an observable difference, for example a difference in the fiducial values exceeding a predetermined threshold, the processor determines that the IMD has flipped.

In a pattern recognition analysis, the processor determines a pattern in the data obtained during the first range of time and another pattern in the data obtained during the second range of time. The pattern may be determined using any suitable method such as pattern recognition algorithm as known in the art, for example, and the two patterns are then compared with each other. If the patterns at least substantially mirror each other or are reversed with respect to each other, for example one pattern having a positive directionality while the other pattern has a negative directionality in the same corresponding portion of the respective patterns, or vice versa, the processor determines that the IMD has flipped.

In some examples, the processor may obtain additional data to either assist in the determination that the IMD has flipped, or to use the additional data as confirmation that the medical device has flipped once that determination has been made. For example, the additional data may include at least one of: magnetometer measurement data, impedance measurement data, optical sensor measurement data, or temperature measurement sensor data. These data, as well as additional suitable data such as Bluetooth signal strength measurement, may be used by the processor to confirm that the IMD has flipped, by comparing the additional data obtained during the first range of time with the additional data obtained during the second range of time.

Measurement data from a magnetometer may be used in providing additional directional data to corroborate with the acceleration data measured by an accelerometer. Additionally or alternatively, the magnetometer may determine an orientation of the user by measuring the direction, strength, or relative change of a magnetic field at a particular location such that, when the IMD is flipped, the measured direction, strength, or relative change of the magnetic field at the same location may be altered. When such alteration exceeds a predetermined threshold value, the processor can use such information to confirm that the IMD has flipped.

Impedance measurement data, such as those obtained via impedance electrodes installed on the IMD, may further be used to detect the impedance measurement taken from the tissues surrounding the medical device. If the IMD is flipped, the impedance vector will change, thereby causing the amplitude of the signal to jump, which may result in impaired impedance sensing. When the IMD flips, the impedance of the tissues or tissue paths surrounding the IMD, or more specifically the tissues or tissue paths in direct or indirect contact with the impedance electrodes installed on the medical device, may either increase (e.g., the tissue between the impedance electrodes is fatty tissue) or decrease (e.g., the tissue between the electrodes is muscle tissue). When the change in the impedance exceeds a threshold value, the processor can use the information to confirm that the IMD has flipped.

Measurement data from an optical sensor installed on the IMD may be used to determine the conditions surrounding the IMD. Detecting a flip is relevant for optical sensors as well because the flip may impact the accuracy of such sensors. For example, an intensity of the ambient light (or brightness) and/or a background radiation detected by the optical sensor can be used as a factor in determining the direction in which the optical sensor is facing; usually, the implanted optical sensor detects greater intensity of light or background radiation while facing forward, or facing toward the chest, than while facing backward, or toward the back or the spine, in some examples. Therefore, when the brightness or background radiation increases or decreases beyond a predetermined threshold value, the processor can use the information to confirm that the IMD has flipped, because the optical sensor is now facing the other direction from when it was previously measured.

Temperature measurement, obtained from a thermometer for example, can also help determine that the IMD has flipped. For example, there may be a change in temperature when the thermometer installed on the IMD is flipped, because the thermometer may be closer or further from an organ which generates body heat, including but not limited to the heart. Furthermore, body heat may also be generated by contraction of skeletal muscles, so depending on where the IMD is implanted, the IMD may also detect an increase in temperature when the thermometer is directed toward such heat source. In any event, when there is a change in the detected temperature beyond a predetermined threshold, the processor can use the information to confirm that the IMD has flipped.

After the processor has determined that the IMD has flipped, there are a plurality of actions that the processor may choose to implement. Accordingly, in some embodiments, any number of different monitoring processes may be corrected to account for the fact that the orientation has changed from its assumed (or previously determined) orientation. Applying a correction to an output of a monitoring process may be achieved by modifying an output directly and/or by recalibrating the monitoring process to account for the different (e.g., flipped) orientation of the IMD. In some embodiments, the monitoring process may include, for example, a posture algorithm (e.g., an algorithm configured to monitor a sleep incline or orientation), a heart sounds algorithm, and/or an impedance sensing process.

In some examples, the processor also applies a label to the generated data to mark when the device has flipped, such that it can be referenced later on by physicians, or alternatively by researchers and developers wanting to improve upon the IMD to reduce such flipping, for example. In some examples, the flipping causes the processor to switch between low-power and high-power Bluetooth connection link, such that the appropriate power setting is used based on the current position of the IMD, which may benefit in saving battery power by reducing the power when the IMD is facing forward or toward the chest, for example. In some examples, the processor may transmit alert notifications such as an alarm, email or text message, automated phone call, etc., to notify the user, who may be the patient or the doctor, physician, or caretaker responsible for monitoring the patient's health.

Advantages of implementing the aforementioned flip detection method include increased accuracy in the determination that the IMD has flipped. By comparing the directionality of the generated respiration data or the acceleration data with the ECG data and/or the impedance data, the processor can more accurately determine the occurrences of flipping. And when it does, the processor can take the appropriate actions to either alert the user or to apply correction to the output of monitoring process to improve the accuracy thereof. As the complexity of IMDs increases (and the overall size decreases), it is important to accurately determine such changes in orientation. Also, the determination of whether the IMD has flipped can be made in a shorter period of time, such as less than a day, less than half a day, less than a few hours, less than an hour, or even less than half an hour, for example, because the method as disclosed herein requires fewer samples, over a shorter range of time, of respiration data, acceleration data, ECG data, and/or impedance data, as appropriate, to make such determination, as compared to other methods in the art, which may require at least an entire day's worth of data samples with which to perform calculations in order to make such determinations.

The aforementioned methods may be applicable to any two or more signals that are expected to change polarities with respect to each other when the device flips. The respiration data incorporating RSA as mentioned above may be implemented as part of an atrial fibrillation detection algorithm, in some examples. Detecting a flip is relevant for optical sensors because the flip may impact the accuracy of sensors, so the implementation of the aforementioned methods can improve the accuracy of the optical sensors.

Various modifications and additions can be made to the exemplary embodiments discussed without departing from the scope of the disclosed subject matter. For example, while the embodiments described above refer to particular features, the scope of this disclosure also includes embodiments having different combinations of features and embodiments that do not include all of the described features. Accordingly, the scope of the disclosed subject matter is intended to embrace all such alternatives, modifications, and variations as fall within the scope of the claims, together with all equivalents thereof.

We claim:

1. A system comprising:
a medical device comprising an acceleration sensor configured to generate acceleration data and at least two electrodes configured to generate electrocardiogram (ECG) data;
a processor; and
a memory containing computer-executable instructions that, when executed by the processor, cause the processor to:
obtain the acceleration data and the ECG data from a first range of time and a second range of time different from the first range,
generate respiration data based on the acceleration data, and
determine that the medical device has flipped in orientation during the second range of time by comparing the respiration data and the ECG data of the first range of time with the respiration data and the ECG data of the second range of time.

2. The system of claim 1, wherein the instructions are configured to cause the processor to determine that the medical device has flipped by causing the processor to:
identify a change from the respiration data and the ECG data of the first range of time to the second range of time; and
determine, based on the identified change, that the medical device has flipped.

3. The system of claim 1, wherein the comparing the respiration data and the ECG data comprises performing at least one of: phase comparison analysis, correlation analysis, fiducial comparison analysis, or pattern recognition analysis.

4. The system of claim 1, wherein the instructions are further configured to cause the processor to:
update a heart sound generation algorithm in response to determining that the medical device has flipped, wherein the heart sound generation algorithm is configured to generate heart sound data based on the acceleration data.

5. The system of claim 1, wherein the instructions are further configured to cause the processor to:

perform recalibration of the medical device in response to determining that the medical device has flipped.

6. The system of claim 1, wherein the first range of time and the second range of time are between 5 seconds and 30 seconds.

7. The system of claim 1, wherein the instructions are further configured to cause the processor to:
generate an alert notification to a user of the medical device in response to determining that the medical device has flipped.

8. The system of claim 1, wherein the instructions are further configured to cause the processor to:
switch between a low-power communication link and a high-power communication link for the medical device in response to determining that the medical device has flipped.

9. The system of claim 1, wherein the instructions are further configured to cause the processor to: confirm that the respiration data is in a frequency range of below about 1 Hz.

10. A system comprising:
a medical device comprising an acceleration sensor configured to generate acceleration data and an impedance sensor configured to generate impedance data;
a processor; and
a memory containing computer-executable instructions that, when executed by the processor, cause the processor to:
obtain the acceleration data and the impedance data from a first range of time and a second range of time different from the first range,
generate respiration data based on the acceleration data, and
determine that the medical device has flipped in orientation during the second range of time by comparing the respiration data and the impedance data of the first range of time with the respiration data and the impedance data of the second range of time.

11. The system of claim 10, wherein the instructions are configured to cause the processor to determine that the medical device has flipped by causing the processor to:
identify a change from the respiration data and the impedance data of the first range of time to the second range of time; and
determine, based on the identified change, that the medical device has flipped.

12. The system of claim 10, wherein the comparing the respiration data and the impedance data comprises performing at least one of: phase comparison analysis, correlation analysis, fiducial comparison analysis, or pattern recognition analysis.

13. The system of claim 10, wherein the instructions are further configured to cause the processor to:
update a heart sound generation algorithm in response to determining that the medical device has flipped, wherein the heart sound generation algorithm is configured to generate heart sound data based on the acceleration data.

14. The system of claim 10, wherein the instructions are further configured to cause the processor to:
perform recalibration of the medical device in response to determining that the medical device has flipped.

15. The system of claim 10, wherein the first range of time and the second range of time are between 5 seconds and 30 seconds.

16. The system of claim 10, wherein the instructions are further configured to cause the processor to:
generate an alert notification to a user of the medical device in response to determining that the medical device has flipped.

17. The system of claim 10, wherein the instructions are further configured to cause the processor to:
switch between a low-power communication link and a high-power communication link for the medical device in response to determining that the medical device has flipped.

18. The system of claim 10, wherein the instructions are further configured to cause the processor to: confirm that the respiration data is in a frequency range of below about 1 Hz.

19. A processor-implemented method comprising:
obtaining acceleration data from an acceleration sensor of a medical device during a first range of time and a second range of time different from the first range;
obtaining during the first range of time and the second range of time either (a) electrocardiogram (ECG) data from at least two electrodes of the medical device or (b) impedance data from an impedance sensor of the medical device;
generating respiration data based on the acceleration data; and
determining that the medical device has flipped in orientation during the second range of time by comparing the respiration data and either (a) the ECG data or (b) the impedance data of the first range of time with the respiration data and either (a) the ECG data or (b) the impedance data of the second range of time.

20. The method of claim 19, wherein the comparing the respiration data and either (a) the ECG data or (b) the impedance data comprises:
performing at least one of: phase comparison analysis, correlation analysis, fiducial comparison analysis, or pattern recognition analysis.

* * * * *